United States Patent [19]

Hemsky et al.

[11] Patent Number: 4,733,295

[45] Date of Patent: Mar. 22, 1988

[54] LUMINANCE SELECTION APPARATUS FOR VIDEO SIGNAL CONTROL SYSTEM

[75] Inventors: Robert L. Hemsky; Terry L. Tucker, both of Boca Raton, Fla.

[73] Assignee: Utah Scientific Advanced Development Center, Inc., Ft. Lauderdale, Fla.

[21] Appl. No.: 52,122

[22] Filed: May 15, 1987

Related U.S. Application Data

[63] Continuation of Ser. No. 791,372, Oct. 25, 1985, abandoned, which is a continuation-in-part of Ser. No. 760,339, Jul. 29, 1985, which is a continuation-in-part of Ser. No. 604,845, Apr. 27, 1984, Pat. No. 4,642,682.

[51] Int. Cl.$^4$ .............................................. H04N 9/74
[52] U.S. Cl. .......................................... 358/22; 358/28; 358/80
[58] Field of Search ...................... 358/22, 27, 28, 80

[56] References Cited

U.S. PATENT DOCUMENTS

| | | | |
|---|---|---|---|
| 3,647,941 | 3/1972 | Andrade et al. | 358/28 |
| 3,649,748 | 3/1972 | Knauer | 358/28 |
| 3,737,561 | 6/1973 | Boer | 358/28 |
| 3,787,611 | 1/1974 | Poetsch et al. | 358/27 |
| 3,875,583 | 4/1975 | Poetsch et al. | 358/28 |
| 4,525,736 | 6/1985 | Korman | 358/28 |
| 4,533,938 | 8/1985 | Hurst | 358/28 |

FOREIGN PATENT DOCUMENTS

| | | | |
|---|---|---|---|
| 124189 | 7/1985 | Japan | 358/22 |
| 930749 | 5/1982 | U.S.S.R. | 358/22 |

Primary Examiner—John W. Shepperd
Attorney, Agent, or Firm—Jones, Askew & Lunsford

[57] ABSTRACT

A luminance selection apparatus for correcting the hue, saturation and luminance of an input color video signal as a function of the luminance of the signal. The system allows setting and storing luminance threshold levels which are used in conjunction with other color selection circuitry to select a region of interest in a video image being displayed. An operator selects a particular hue of interest with color selection circuitry, and then sets a luminance threshold level which discriminates between the same or similar hues in a video image which differ in luminance. In one embodiment, prestored digital correction values are retrieved from memory and converted into analog correction signals which modify the phase, amplitude and DC level of the composite video signal only when the input luminance exceeds the threshold level. In another embodiment, independent color derivative signals are employed in conjunction with the luminance of the input video signal to route signals from operator controls to a channel carrying video signals of the selected hue, so that only a selected hue which does not exceed the luminance threshold level receives color correction.

22 Claims, 5 Drawing Figures

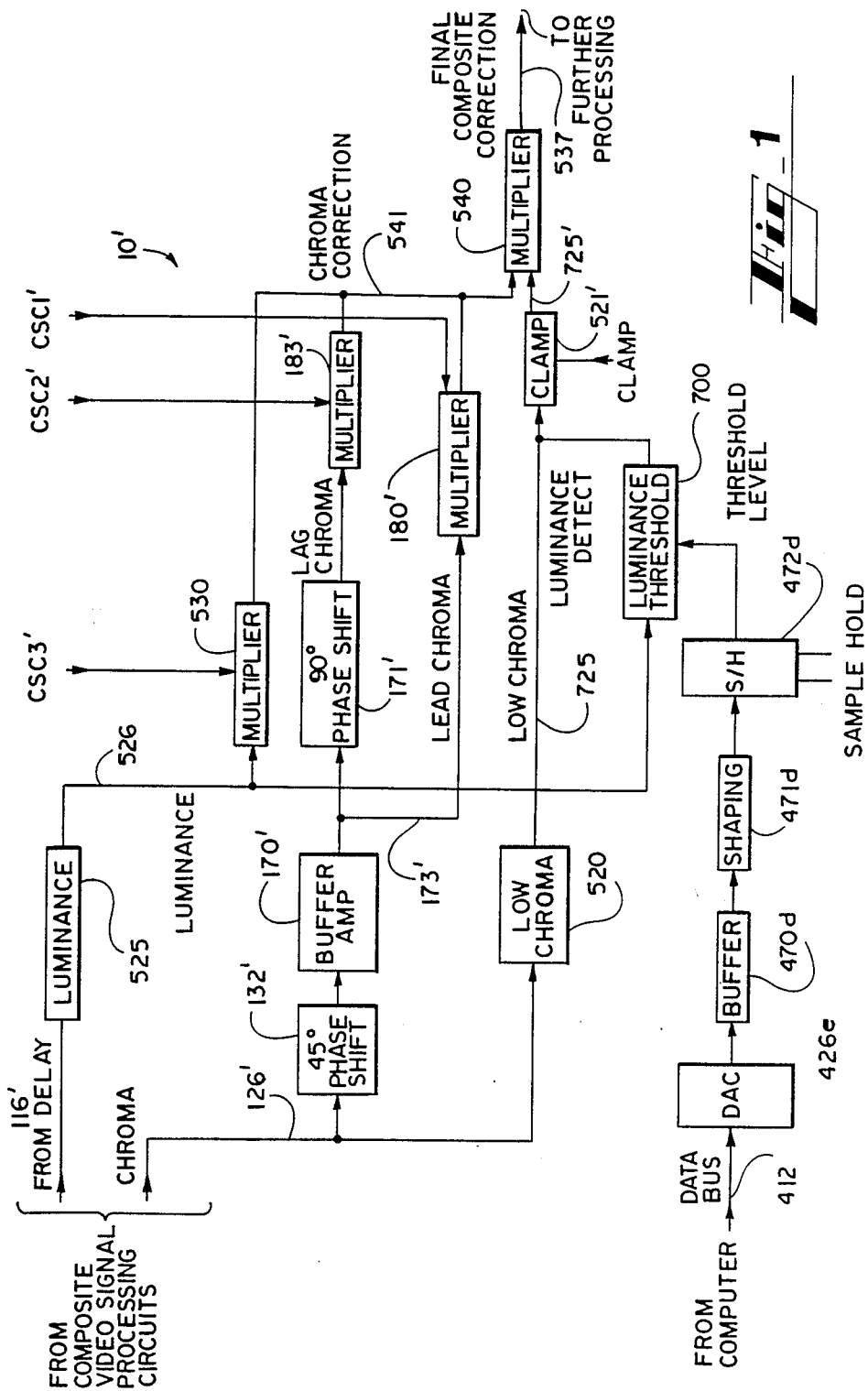

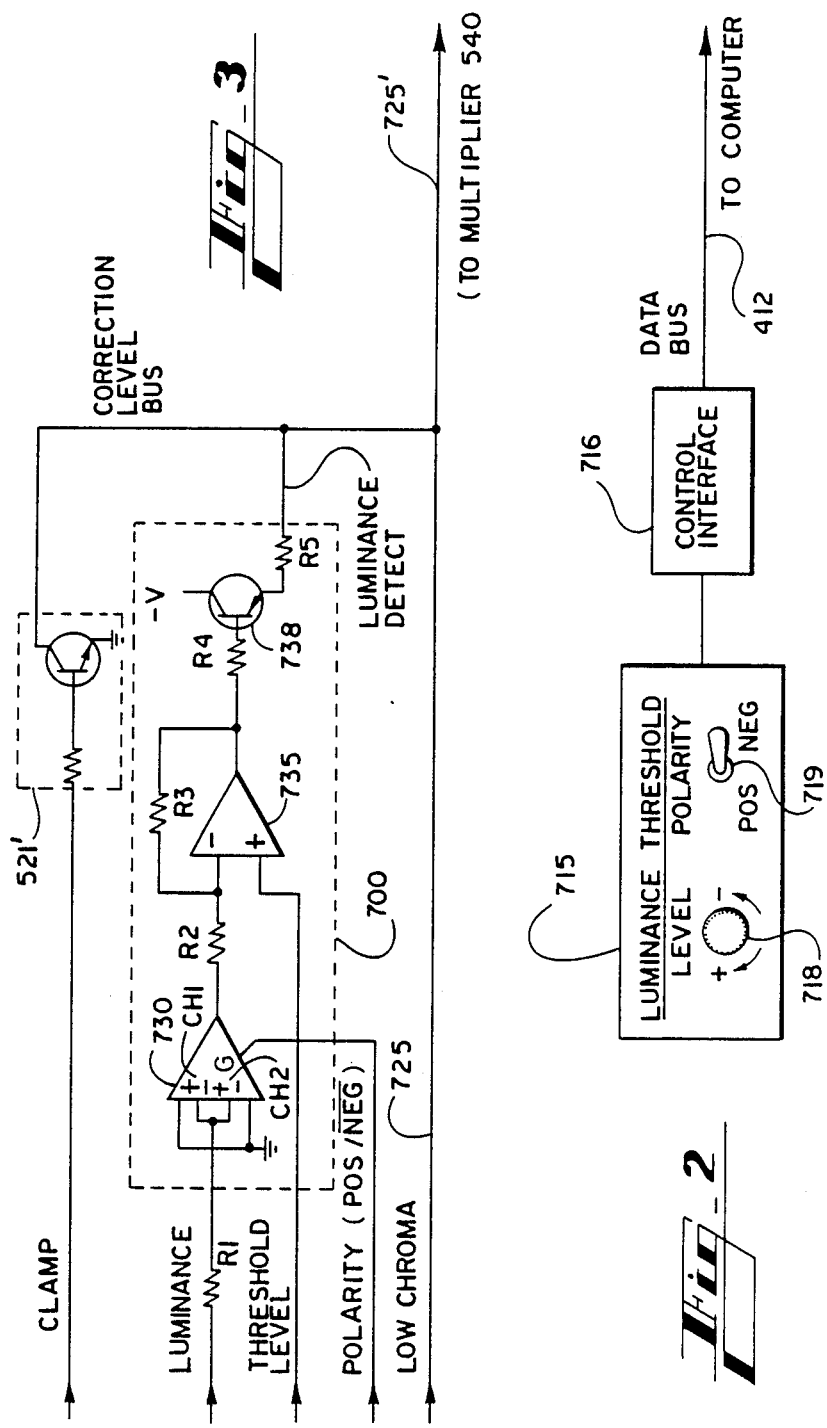

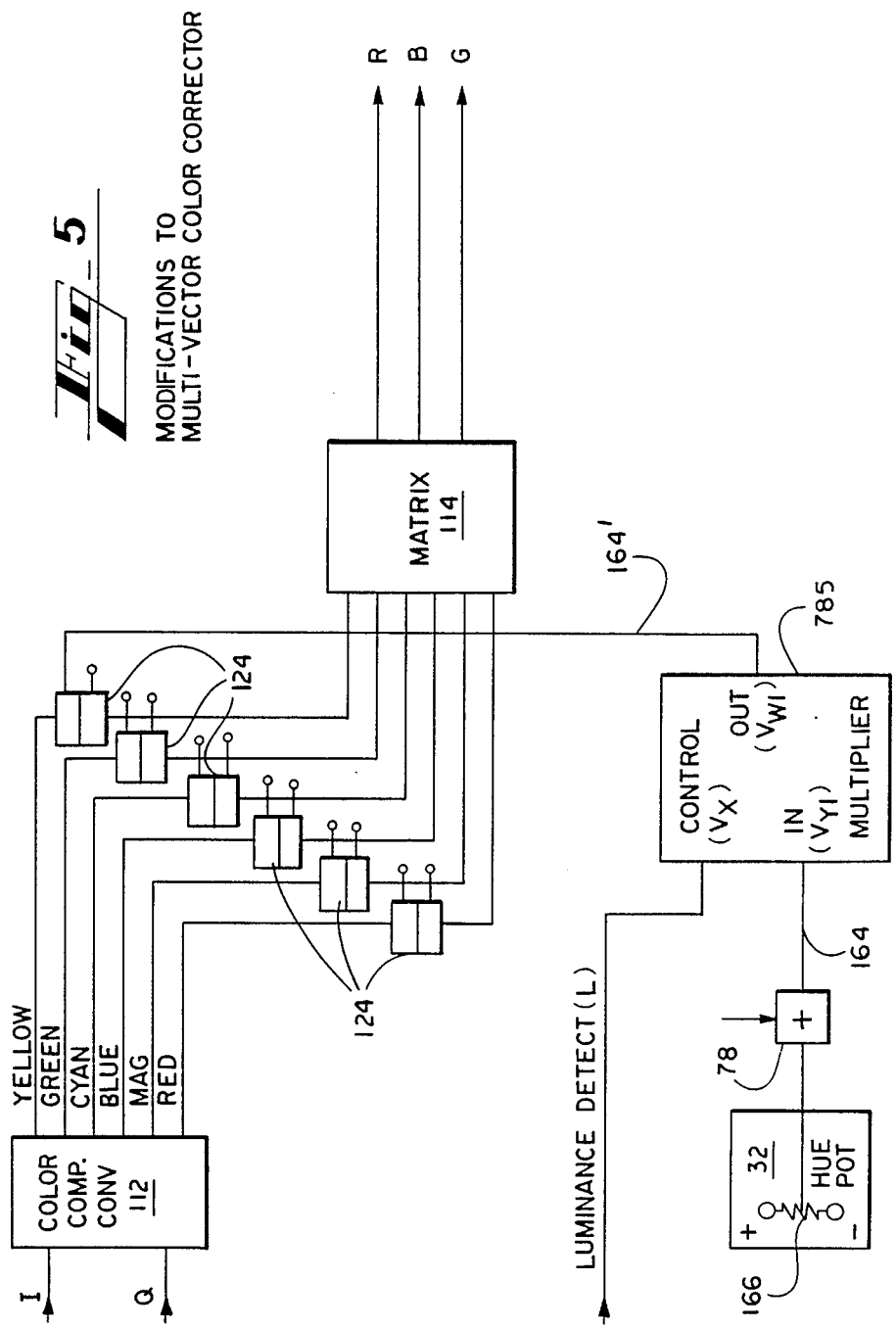

LUMINANCE SELECTION APPARATUS FOR VIDEO SIGNAL CONTROL SYSTEM

CROSS-REFERENCE TO RELATED APPLICATION

This application is continuation of application Ser. No. 06/791,372, filed Oct. 25, 1985, now abandoned which is a continuation-in-part of application Ser. No. 760,339, filed July 29, 1985, which is a continuation-in-part of application Ser. No. 604,845, filed Apr. 27, 1984, now U.S. Pat. No. 4,642,682.

TECHNICAL FIELD

The present invention relates generally to systems for the correction and control of video signals, and relates more particularly to an apparatus for selecting a portion of a video image for color correction based on the luminance of a portion of the image, the image being represented by a color video signal produced by a motion picture telecine, video tape reproducer or other video media.

BACKGROUND OF THE INVENTION

Copending application Ser. No. 760,339, the disclosure of which is incorporated herein by reference and made a part hereof, discloses a phase responsive color video signal correction system which allows correction of the spectral distribution and luminance aspects of a phase-encoded composite video signal. U.S. Pat. No. 4,096,523 to Belmares-Sarabia, the disclosure of which is incorporated herein by reference and made a part hereof, discloses another technique for color correcting video signals wherein the primary color video signals are separated into six independent primary and complementary video signals over which separate control can be exercised in making color corrections. The latter system is sometimes known as a "six vector" or "multivector" system, and is also sometimes known as a "matrix" type color corrector.

While both of the above-referenced video signal control systems allow color correction of input video signals, both systems leave room for advancement in selecting a portion of an image represented by an input video signal for correction. Most color correction systems are generally hue oriented, in that the controls over video parameters such as hue, saturation, and luminance are grouped or organized according to hue. For example, in the Belmares-Sarabia system a panel of hue, saturation and luminance controls is provided, there being a separate hue, saturation, and luminance control for each one of the six primary and complementary colors. In the referenced copending phase responsive video signal control system, there is also a separate hue, saturation, and luminance control for each of the color vectors or fans. Both of these systems may be considered a "control per hue" system.

Although there is greater selectivity in the phase responsive system which allows an operator to select a hue for correction with greater particularity than in the prior art, there is often a need to distinguish between regions in a video image which have the same hue but which may differ in luminance. There are many occasions when a given scene may contain several different regions which have similar hues, but only one region requires color correction. Often, these similarly-colored regions will have different luminances. For example, a color correction system operator may decide that a red dress worn by a subject in a given scene requires a color correction. However, assume that the scene also includes a red soft drink cup and a red tablecloth so close in hue to the red dress that selection of the red dress for a color correction results in imposing undersirable color corrections to the soft drink cup and the tablecloth. Yet, the luminance for all these objects may differ appreciably. The inability of prior art color correction systems to differentiate between objects having the same hue but different luminance leads to possible inefficiencies in operation and slows the color correction process, because the operator must repeatedly adjust controls in order to achieve an aesthetically pleasing balance between adjustments for the red dress, soft drink cup, and tablecloth.

Accordingly, there is a need for color video control circuitry which is able to select a portion of a video image for colorimetry correction by allowing discrimination between portions of a video image which have similar hues but which may differ in luminance.

SUMMARY OF THE INVENTION

The present invention overcomes the above-described difficulty in distinguishing between similar hues by allowing selection of a hue or color region in a video image as a function of the luminance of the hue. In particular, the video image is displayed on a color monitor, and a portion of the video image over which control is to be effectuated is selected by employing a color corrector which selects a region for color correction as a function of the hue of the region as well as the luminance of the selected hue. The color corrector is operative to provide color corrections only for a range of hues which possess a predetermined luminance. Regions which have a similar hue but a different luminance are not affected.

Briefly described, the present invention comprises in a video color correction system, an improved apparatus for selecting a color for correction. Color selection means allow a colorimetry operator to first select a hue of interest in the video image, and selectively variable luminance threshold means allows color corrections to be imposed only on portions of the image above or below a predetermined luminance level (depending on polarity). The preferred embodiment comprises means responsive to the luminance of an input color video signal exceeding a predetermined threshold magnitude for providing a control signal, and color correction means responsive to the control signal for correcting a video parameter of the input color video signal such as hue, saturation or luminance.

In the preferred embodiment, the luminance threshold magnitude is selectively varied with an operator control knob, and the system allows selection of hues and luminance which either exceed the threshold magnitude, or alternatively fall below the threshold. Advantageously, therefore, particular regions in the video image may be isolated for color correction based upon whether regions have a greater or a lesser luminance than the threshold magnitude.

More particularly described, the present invention provides an apparatus and method for correcting a video parameter of a portion of a video image at least partially defined by a predetermined hue and a predetermined luminance. The system of the preferred embodiment includes circuitry for detecting the predetermined hue by detecting the relative phase between the input phase-encoded composite video signal and a subcarrier reference signal, and provides a "chroma detect" signal related to the predetermined hue. A luminance detecting circuit detects when the luminance of the input video signal exceeds a predetermined threshold magnitude, and provides a luminance detect signal related to the predetermined luminance level. These circuits operate in conjunction to select a region of interest for correction.

To impose correction on a selected region of interest, correction signal circuitry provides a plurality of correction signals, each of the correction signals being related to a predetermined video parameter such as hue, saturation or luminance. In the preferred embodiment, the correction signal circuitry recalls from a correction signal memory a plurality of pre-stored correction signals which are related to a predetermined desired values of the video parameter for particular predetermined hues. Correction signal selecting means responsive to the chroma detect signal and the luminance detect signal selects a particular one of the correction signals for imposition on the selected region of the video image. Finally, correction circuitry responsive to a selected particular correction signal then corrects a video parameter such as hue, saturation or luminance of the input video signal to provide a color corrected video output signal.

In the preferred embodiment, a "luminance threshold" control knob provides signals for selecting the luminance threshold level. An operator then can employ either a phase-responsive color video signal correction system, a multi-vector or matrix type color corrector, or other type of color corrector to select a particular hue for correction, and then "fine tune" a region of interest by adjusting the luminance threshold knob until only the region of interest is affected by movement of color correction controls. Regions of the video image which have the same or a similar hue to the region of interest but which differ in luminance are not affected.

Video parameters over which control can be exercised in the present invention include the hue and saturation of the detected portion of the video image. These parameters are controlled by shifting the phase of the phase-encoded video signal for controlling the hue and modifying the amplitude for controlling the saturation so as to actually modify the phase-encoded video signal as disclosed in the referenced copending application. Also controllable is the luminance of the region of the video image represented by the composite color video signal, by altering the luminance portion of the composite video signal.

In another embodiment for use in a multi-vector or matrix system, the luminance detect signal derived from the luminance threshold circuit routes DC control signals from a set of controls to the independent primary or complementary color channel carrying the hue of interest.

Accordingly, it is an object of the present invention to provide an improved system for the selection of a portion of a video image for which color control is desired.

It is another object of the present invention to provide an improved system for correction and control of color video signals.

It is another object of the present invention to provide an improved apparatus for selecting a portion of a video signal for luminance and spectral content correction.

It is another object of the present invention to provide a color video correction and control system which allows selection of a hue of interest for color correction or control as a function of the luminance of the hue.

It is another object of the present invention to provide a color video correction and control system which only affects portions of a video image having a predetermined luminance.

It is another object of the present invention to provide a color video correction and control system which limits color correction to portions of a video image defined by a selectively variable luminance range.

It is another object of the present invention to provide a luminance-responsive color video correction and control system which can be selectively configured to affect portions of a video image above a selectable predetermined threshold luminance or alternatively below a selectable predetermined threshold luminance.

It is another object of the present invention to provide an improved color video correction and control system for controlling the hue, saturation and luminance of a portion of a video image preparatory to broadcasting or recording the video signal representing the image.

It is another object of the present invention to provide a color video correction and control system which allows selection of a portion of a video image for correction and which can be employed in a composite video signal control system as well as in a multi-vector or matrix type color control system.

These and other objects, features and advantages of the present invention may be more clearly understood and appreciated from a review of the following detailed description of the preferred embodiments and by reference to the appended drawings and claims.

BRIEF DESCRIPTION OF THE DRAWINGS

FIG. 1 is a schematic block diagram of a portion of a phase-responsive color video correction and control system incorporating the preferred embodiment of the luminance selection circuit of the present invention.

FIG. 2 illustrates the operator control panel and interface employed in the preferred embodiment of FIG. 1.

FIG. 3 is a detailed schematic diagram of the luminance selection circuit illustrated in FIG. 1.

FIG. 5 is a detailed schematic diagram of the luminance selection circuitry adapted to be operative in a multi-vector or matrix type color correction system.

DETAILED DESCRIPTION OF THE PREFERRED EMBODIMENT

Figure 4A:
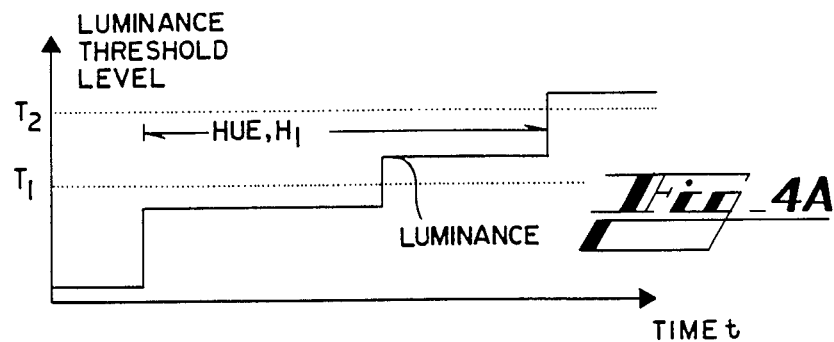
FIG. 4, consisting of FIGS. 4A-4D, are wave form diagrams illustrating operation of the luminance selection circuitry of the preferred embodiment.

Referring now to the drawings, in which like numerals indicate like elements throughout the several Figures. FIG. 1 shows a block schematic diagram of a portion of a phase responsive composite video signal correction or control system 10' adapted with the luminance selection or threshold circuit 700 constructed in accordance with the preferred embodiment. For purposes of describing the preferred embodiment, it will be understood that the luminance selection circuit 700 comprises circuitry modifications to the copending parent application, Ser. No. 760,339, filed July 29, 1985, and owned by the same assignee as the present application, the disclosure of which is incorporated herein by reference and made a part hereof. Accordingly, it will be understood that the reference numerals for the components described therein are the same as herein, except as otherwise noted.

It will first be understood that the modifications described herein can be easily made to the second preferred embodiment 10' of the phase responsive composite video signal control system described in the referenced copending parent application. As described in that application, the phase responsive circuitry operates to detect the instantaneous hue of a video image, provides signals which select one of a plurality of color intervals or windows within which the detected instantaneous hue falls, retrieves pre-stored correction values associated with the selected color interval, and converts the selected correction signals into signals which modify the phase, amplitude and luminance level of the composite video signal, to produce a color-corrected composite video signal output.

In order to provide a selectively variable luminance threshold for the phase responsive color correction circuitry, there is provided in the preferred embodiment a luminance threshold or selection circuitry 700 which operates in conjunction with the phase responsive video signal correction system 10' described in the parent application. In addition, a "luminance threshold" control panel 715 (FIG. 2) is provided in the control panel 45 of the referenced copending application so that an operator may select a luminance threshold level and polarity. A control panel interface circuit 716 receives signals provided by the actuation of a luminance threshold level control knob 718 and a luminance threshold polarity switch 719 into computer-readable form for the data bus 412. The operation of the control knob 718 is more particularly described in copending application Ser. No. 495,783 entitled "Video Signal Control System" now U.S. Pat. No. 4,597,006, and which is assigned to the same assignee as of the present invention, the disclosure of which is incorporated by reference herein.

Those skilled in the art will understand that movement of the luminance threshold level control knob 718 or actuation of the luminance threshold polarity switch 719 from "positive" to "negative" or back is detected via the interface circuit 716 by the control computer in the phase responsive system of the preferred embodiment, which then controls the circuitry of the present invention in a manner which will be described hereinbelow. In the preferred embodiment, the interface circuit 716 is connected to the data bus 412 of the microcomputer 50' so that the movement of the control knobs by the operator can be converted into signals indicative of the luminance threshold level.

Still referring to FIG. 1, in the preferred embodiment the luminance threshold or selection circuit 700 is operative in the phase-responsive circuitry so as to suppress color correction of the video signal whenever the input video signal does not meet the luminance threshold condition. Stated in other words, the provision of color correction in the preferred embodiment described herein depends upon two conjunctive conditions: first, the hue of interest must be occurring in the input video signal, and second, the luminance of the input video signal must be above the predetermined luminance threshold level (for positive polarity) or below the luminance threshold level (for negative polarity). The circuitry illustrated in FIG. 1 is responsive to the luminance and chrominance of the input video signal to suppress correction in the absence of these conditions, thereby allowing the input signal to pass through the system unmodified.

As more particularly described in the referenced copending parent application, the uncorrected phase encoded input video signal is separated into chrominance and luminance signal components, shown in FIG. 1 as the LUMINANCE signal on line 526 and the CHROMA signal on line 126'. The LUMINANCE signal is provided as one input to the luminance threshold or selection circuit 700. The CHROMA signal on line 126' is provided through a 45-degree phase shift circuit 132', a buffer amplifier 170', an additional 90 degree phase shift circuit 171', and thence into multipliers 183' and 180' for combining with correction signals CSC1' and CSC2'. The LUMINANCE signal is also provided to a multiplier 530 for combining with correction signal CSC3'. The outputs of multipliers 180', 183' and 530 are all connected to a summing junction on line 541, denominated "CHROMA CORRECTION", where the results of the combination of the luminance and chrominance signals with their respective correction signals are combined. Line 541 is then connected to a multiplier circuit 540, where it is combined with signals received from a clamp circuit 521'. The clamp circuit 521' operates in conjunction with the low chroma circuit 520 and the luminance selection circuit 700 to selectively reduce or even eliminate the correction on line 541 under certain conditions.

Also as described in the referenced copending parent application, the low chroma circuit 520 determines when the magnitude of the CHROMA signal falls below a predetermined threshold, for selectively varying the correction at low chrominance levels. The output of the low chroma circuit 520 is denominated LOW CHROMA, which is provided on line 725. The output of the luminance threshold circuit 700, denominated LUMINANCE DETECT, is also connected to line 725, which serves as a summing junction. The additive combinative of LOW CHROMA and LUMINANCE DETECT is provided to the input of the clamp circuit 521, which as described earlier, operates in combination with the CHROMA CORRECTION signal on line 541 to provide a final correction signal denominated FINAL COMPOSITE CORRECTION on line 537, which is provided to further processing circuitry as described and illustrated in the referenced copending parent application.

As described in detail in the referenced copending parent application, a plurality of correction signals are repetitively provided in the phase responsive color correction system, for detecting when the input video signal corresponds to a particular hue. The system then selects and imposes on the input video signal a particular correction signal which is related to the particular predetermined detected hue. The present invention allows another level of selection for correction by only allowing full correction, as manifested by the correction signals CSC1', CSC2' and CSC3', to be imposed on the input video signal when the luminance of the input video signal exceeds the threshold magnitude. If the input video signal does not exceed the predetermined magnitude (positive polarity), correction is suppressed, and the input video signal passes through the circuitry unmodified. It will therefore be understood that the signal FINAL COMPOSITE CORRECTION on line 537 provided to the further processing circuitry in the referenced copending application is reduced or eliminated under the condition that the luminance of the input video signal does not exceed the predetermined threshold magnitude.

The luminance threshold level is set through the control panel 715; movements of the LEVEL knob 718 or the POLARITY switch 719 are converted into digital signals and stored in the memory of the microcomputer 50' described in the parent application. The selectively variable luminance threshold level is then provided from computer memory over the computer data bus 412 to a digital-to-analog converter (DAC) 426e, which in the preferred embodiment is a type AD7226 quad eight-bit D/A converter manufactured by Analog Devices, Inc. of Norwood, Mass. As will be known to those skilled in the art, the DAC 426e provides an analog voltage level as an output.

The analog threshold level from the DAC 426e is then amplified by a buffer amplifier 470d, which corresponds to the buffer amplifiers 470 illustrated in the referenced copending parent application. The output of the buffer amplifier 470d is then passed through a shaping circuit 471d, which corresponds to the shaping circuits 471 shown and described in the referenced copending parent application. The shaped luminance threshold signal then is provided to a sample-and-hold (S/H) circuit 472d, which corresponds to the sample-and-hold circuits 472 shown and described in the referenced copending parent application. The output of the sample-and-hold circuit 472d is designated THRESHOLD LEVEL and is provided twice per subcarrier cycle of the CHROMA signal, as determined by the signals SAMPLE and HOLD originating from the correction signal selecting circuit 455 shown and described in the referenced copending parent application.

It will therefore be understood that the signal THRESHOLD LEVEL can vary at the subcarrier frequency, 3.58 MHz, so that nominally a different threshold level can be provided for a plurality of different hues occurring in a single horizontal video line. Stated in other words, there is provided and stored a plurality of LUMINANCE THRESHOLD signals, one for each of the color fans or windows. In the disclosed embodiment having sixteen windows, therefore, sixteen different LUMINANCE THRESHOLD signals are stored in memory, one for each fan. These signals are repetitively provided as in the manner of the correction signals CSC1', CSC2', and CSC3', and selected by the positive crossings of the CHROMA signal as described in the parent application. Therefore, it will be understood that there may be selected and provided a different luminance threshold for each of the color windows in the preferred embodiment.

In the preferred embodiment, there are provided a plurality of hue, saturation and luminance control knobs, one for each color fan or window, as described in the referenced copending application; in copending application Ser. No. 776,438, filed Sept. 16, 1985, entitled "Color Selection Apparatus for Video Signal Control System", owned by the same assignee as the present invention, there is shown and described a video signal selection apparatus which allows selection of a particular region on a video monitor displaying an input video signal. In both of these systems, the control computer is responsive to the most recently-moved control knob to "remember" which knob was moved last. The preferred embodiment of the present invention provides a single luminance threshold level knob 718 and polarity switch 719 in the control panel 715; the control microcomputer 50' in the preferred embodiment operates to associate movement of the luminance level knob or polarity switch with the color fan or window most recently selected by an operator in the system shown in the referenced copending parent application, or to the selected hue in the referenced copending "color selection apparatus" application. It will therefore be understood that a plurality of different luminance threshold levels and polarities can be created and stored in computer memory in a location associated with a particular color fan or window, so that the concurrence of a particular predetermined hue and threshold level allow correction to be imposed or suppressed upon the input video signal.

Referring now to FIG. 3, next will be described the construction of the luminance selection circuit 700 and its operation in conjuction with the phase responsive color correction circuitry 10'. The preferred embodiment of the luminance selection circuit 700 employs a differential amplifier 730 for selecting the threshold polarity. The preferred differential amplifier is a type MC1445, two-channel input differential amplifier, manufactured by Motorola Semiconductor Products, Inc., Phoenix, Ariz. The gate control input G of the amplifier 730 receives a signal denominated POLARITY (POS/NEG), which is a high voltage level when positive polarity is selected and a low voltage level when negative polarity is selected. The POLARITY signal is provided from the polarity switch 719, via the computer.

The LUMINANCE signal is provided to the inputs of differential amplifier 730 through a load resistor R1 in the following manner. The noninverting input of one channel CH1 and the inverting input of the other channel CH2 are grounded, while the LUMINANCE signal is provided to the inverting input of the first channel CH1 and the noninverting input of the second channel CH2. Those skilled in the art will appreciate that changing the voltage level at the G input results in a polarity inversion of the LUMINANCE signal.

The output of the amplifier 730 is provided through a load resistor R2 to the inverting input of a video operational amplifier 735, which is a type HA5190 amplifier in the preferred embodiment. A feedback resistor R3 is connected between the output and the inverting input of amplifier 735 to provide unity gain. The noninverting input receives the signal THRESHOLD LEVEL from the sample-and-hold circuit 472d (FIG. 1). Those skilled in the art will understand and appreciate that an output from amplifier 735 appears only when the LUMINANCE signal exceeds the magnitude of the THRESHOLD LEVEL signal in absolute terms, and that the POLARITY signal causes the output from amplifier 735 to appear either when LUMINANCE exceeds THRESHOLD LEVEL or when LUMINANCE is below THRESHOLD LEVEL.

The output of amplifier 735 is connected through a base-biasing resistor R4 to the base of a PNP transistor 738, whose collector is tied to the negative rail and whose emitter is connected through resistor R5 to line 725', which is denominated the CORRECTION LEVEL BUS. It will be understood that a positive voltage output from the amplifier 735 switches the transistor 738 "on", pulling line 725' low.

Also connected to line 725' is the LOW CHROMA signal on line 725, as formed and described in the referenced copending parent application. In addition, a clamp circuit 521', which corresponds generally to the CLAMP circuit 521 shown and described in the referenced copending parent application, pulls the CORRECTION LEVEL BUS 725' to ground during the occurrence of the CLAMP signal, in the manner described in referenced parent application. It will therefore be understood and appreciated that any of the three following conditions causes the signal on line 725' to be a "low", signifying no correction: (1) during the CLAMP signal, which occurs during the back porch or retrace portions of the video signal in the manner described in the referenced copending parent application, (2) the LUMINANCE signal exceeding the preset THRESHOLD LEVEL signal, which occurs if the luminance of the input signal exceeds the level above which the operator has set, or (3) the LOW CHROMA signal going low, which occurs during low chrominance levels. Line 725' is normally driven positive by the presence of the chroma envelope, as designated by positive voltage level occurring on line 725 from the low chroma circuit 520. Thus, it will be appreciated that either clamping, luminance above or below the threshold (depending on polarity), or low chroma reduces or eliminates correction.

This operation is illustrated more particularly in FIG. 4. In FIG. 4A, the LUMINANCE signal of a portion of a horizontal line is illustrated together with two selectable threshold levels $T_1$ and $T_2$. Assume further that a hue of interest $H_1$ in the video image is present at two adjacent portions of the video image, each having slightly different luminance levels as shown in FIG. 4A. FIGS. 4B, 4C and 4D illustrate the signal levels occurring on line 537, the FINAL COMPOSITE CORRECTION signal. A "high" voltage level signifies full correction, while a "low" voltage level signifies no correction.

Figure 4B:
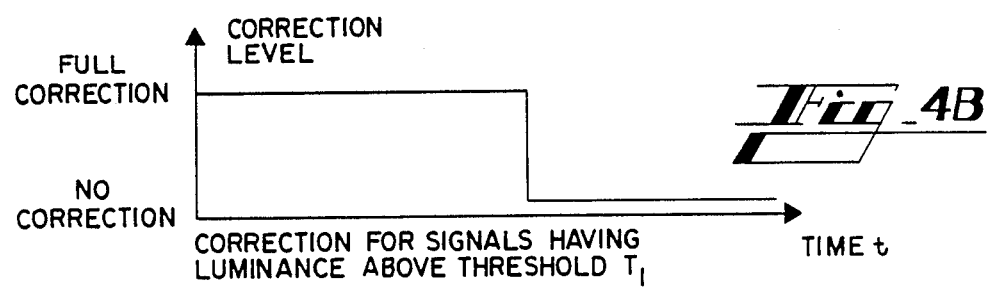
Figure 4C:
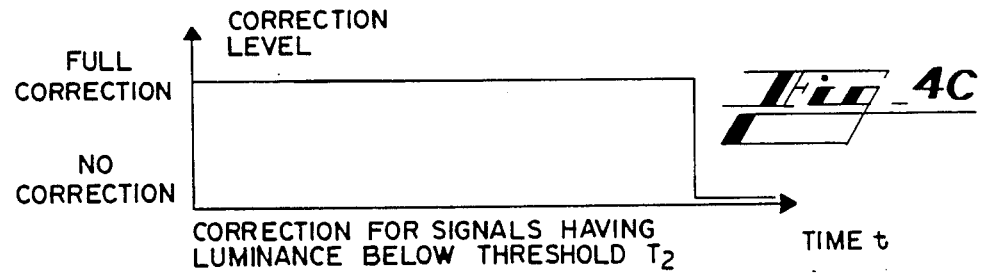

Note in FIG. 4B that when the LUMINANCE signal exceeds the threshold $T_1$, the correction drops to the "no correction" level. Similarly, in FIG. 4C, the correction level drops to "no correction" when the threshold level has been raised to $T_2$.

Figure 4D:
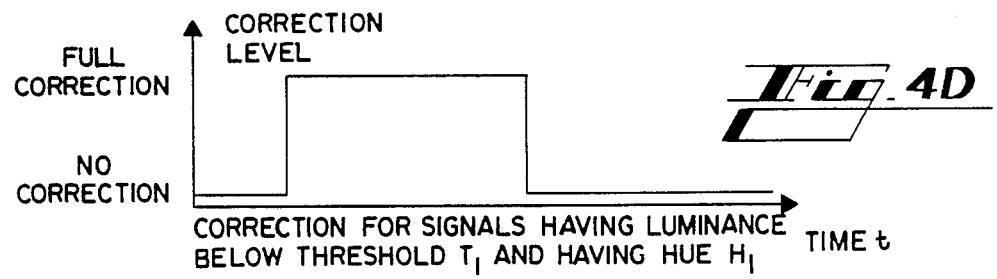

Finally, note in FIG. 4D that the present invention allows discrimination between similar or identical hues which differ in luminance. Assume that the operator desires to impose color correction or some other video parameter correction to the hue $H_1$, but only for those hues below a certain luminance level, say $T_1$ (it is assumed in FIG. 4D that the polarity is "negative"). As illustrated in FIG. 4D, the circuit only allows full correction when the hue is $H_1$ and the luminance is below $T_1$. It will of course be understood that the appropriate hue $H_1$ is detected by the circuitry described in more detail in the referenced copending parent application, and that correction signals appropriate for the hue $H_1$ will occur as the CHROMA CORRECTION signal on line 541 only during such time as hue $H_1$ occurs. It will therefore be understood that the signal illustrated in FIG. 4D illustrates that full correction is only allowed during the simultaneous presence of the hue of interest, $H_1$, when the hue is below the threshold $T_1$.

It will now be understood that the circuitry described above provides means for detecting a predetermined hue in an input video signal, as well as means for detecting a predetermined luminance level by detecting when the luminance of the input video signal exceeds a predetermined threshold magnitude, for allowing greater particularity in the selection of regions in a video image for color correction. Moreover, the coincidence of the LUMINANCE DETECT signal with appropriate correction signals CHROMA CORRECTION, provides correction signal selecting means that are responsive to select particular pre-stored correction signals for selecting regions of a video image, characterized by a predetermined hue and a predetermined luminance.

It will be further understood that signals resulting from the movement of the hue, saturation or luminance control knobs are directed by the computer in the preferred embodiment to appropriate locations in memory, so that during vertical retrace interval updated or revised correction values can be loaded into memory, thereby causing desired color corrections to be imposed upon the image being displayed. It will of course be understood that adjustments to the luminance threshold LEVEL knob 718 and POLARITY switch 719 are stored in appropriate locations associated with particular hues so that the luminance threshold can be employed as an additional condition for selecting regions for color correction. Finally, it will now be appreciated that the circuitry described herein is responsive to correct the input video signal as a function of the operator controls provided, and that the operator control is directed to the color fan selected by the operator by moving an appropriate hue, saturation or luminance control associated with a particular color fan or window, and by adjusting the luminance threshold level associated with that particular color fan.

It will also be understood that the present invention may be adapted for operation with a multi-vector type color correction system as described in U.S. Pat. No. 4,096,523 to Belmares-Sarabia, described and referenced above. Referring to FIG. 5, the modifications required to adapt the multi-vector color corrector illustrated in the referenced Belmares-Sarabia patent will now be described. The color correction system described in said patent employs a modified form of the RCA "CHROMACOMP" color correction unit, which is partially illustrated in U.S. Pat. No. 3,558,806 to Monahan et al. That unit includes a color component converter unit 112 which converts the I and Q signals into three independent primary color components, red, blue and green, as well as three independent complementary color component or derivative signals, yellow, cyan, and magenta. These signals are produced on lines bearing the corresponding color names. The resulting six independent color component signals in the multi-vector color corrector are delivered to control potentiometers 124 and then into a matrix 114 which conducts these signals from the control potentiometers to reform the primary color component signals red, green and blue. It is while the signals are separated into the independent primary and complementary colors that the signals are modified to effectuate color correction. In accordance with referenced U.S. Pat. No. 4,096,523, color corrections for these six independent primary and complementary colors are imposed by remotely controllable active potentiometer circuits 124, described therein.

In order to provide for selection of one of the independent colors for correction with the present luminance-responsive invention, it is necessary to detect the coincidence of a hue of interest with a luminance level. It will be understood from the disclosure in the referenced U.S. Pat. No. 4,096,523 that the hue and saturation of the input video signals is controlled from a hue and saturation control panel 32, which includes six potentiometers for correcting the hue of the three primary and three complementary colors of the video signal, and six potentiometers for controlling the saturation level of those six color components. A single hue potentiometer 166 in the control panel 32 for the yellow channel is illustrated in FIG. 5, it being understood that a separate hue and saturation potentiometer is provided for each of the six primary and complementary color components.

The LUMINANCE DETECT signal is generated as illustrated in FIGS. 1 and 3 hereinabove and in the manner described for indicating when the input video signal exceeds the selectable threshold (or falls below the threshold, depending on polarity). In adapting the LUMINANCE DETECT signal for operation with the referenced U.S. patent, it should be understood that this signal should be made to vary from about zero volts when no correction is desired (the input video signal passes through the color corrector circuit unmodified), to about two volts, indicative of detection of the luminance at or above the level for which correction is indicated. Circuits for modifying the LUMINANCE DETECT signal generated as described herein to vary over such a range are within the skill of the art, and include by way of example and not by way of limitation, analog voltage inverters and scalers.

It will be understood from the discussion in the referenced U.S. Pat. No. 4,096,523 that control signals from the control panel 32 (and in particular from the yellow hue control potentiometer 166) are provided to a summing amplifier 78, where signals from the control panel are combined with stored corrections signals from the computer. In said U.S. patent, the output from the summing amplifier is provided over a line 164 to a respective control potentiometer 124. In modifying said U.S. patent to include the present invention, signals from the summing amplifier 78 are provided on line 164 to an analog multiplier circuit 785 for further control by the LUMINANCE DETECT signal. In the preferred embodiment, multiplier 785 is a type AD539 wideband dual-channel linear multiplier/divider manufactured by Analog Devices, Inc., of Norwood, Mass. The signal input IN ($V_{y1}$) receives the signal on line 164, while the LUMINANCE DETECT signal is provided to the CONTROL ($V_x$) input. The output OUT ($V_{w1}$) is provided on the line 164' which is connected to the respective inputs of the control potentiometers 124 as the DC control signal in the manner described in the referenced U.S. patent.

It will now be understood that the multiplier 785 is operative to allow control signals provided on line 164 to pass through the multiplier to the line 164 to effectuate color correction only when the LUMINANCE DETECT is high (about 2 volts). It will also be understood that correction is suppressed when LUMINANCE DETECT is low (about 0 volts), which results in no correction signals being provided to the potentiometers 124. It will therefore be appreciated that the foregoing circuitry modifications in a matrix-type color corrector as shown in the referenced U.S. patent allows full correction for input video signals only when the luminance of the input video signals exceeds the predetermined luminance threshold magnitude.

It will also be understood and appreciated that saturation and luminance potentiometers can be similarly controlled by luminance-responsive structure illustrated in FIG. 5 to appropriate remotely controllable potentiometer circuits 124 for control over these parameters as well. Further discussion of the operation of the remotely controllable potentiometer circuits 124, and the other supporting circuitry in the referenced U.S. Pat. No. 4,096,523 may be found therein.

It will now be understood that the circuitry illustrated in FIG. 5 provides a plurality of luminance-responsive video parameter correction signals in a multi-vector color corrector, inasmuch as each of the hue, saturation, luminance or other video correction parameters are controlled as a function of the luminance of the input video signals. It will be further understood that the circuitry provides means for selectively controlling the provision of color correction for an input video signal as a function of the luminance of the input video signal, and that the control panel 32 and active potentiometer circuits 124 provide correction means for providing corrected video output signals corresponding and responsive to the luminance of the input video signal.

The preferred embodiments of the present invention have been disclosed by way of example and it will be understood that other modifications may occur to those skilled in the art without departing from the scope and the spirit of the appended claims.

We claim:

1. In a color video signal control system, a luminance responsive color correction system for selecting a region of a video image for receiving corrections to a video parameter, comprising:

means responsive to the luminance of an input color video signal exceeding a predetermined threshold magnitude for providing a control signal; and means for varying said predetermined threshold magnitude a plurality of times on a given video line;

means for detecting the instantaneous hue of said input color video signal;

color correction means responsive to said control signal and said detected instantaneous hue for correcting a video parameter of said input color video signal;

whereby a video parameter of said input color video signal may be corrected a plurality of times on a given video line as a function of luminance which may vary during said given video line.

2. The color correction system of claim 1, wherein said predetermined threshold magnitude is a positive threshold.

3. The color correction system of claim 1, wherein said predetermined threshold magnitude is a negative threshold.

4. The color correction system of claim 1, wherein said predetermined threshold magnitude is selectively variable by an operator.

5. The color correction system of claim 1, wherein said video parameter comprises the hue of said input color video signal.

6. The color correction system of claim 1, wherein said video parameter comprises the saturation of said input color video signal.

7. The color correction system of claim 1, wherein said video parameter comprises the luminance of said input color video signal.

8. The system of claim 1, wherein said color correction means comprises a phase responsive color corrector.

9. The system of claim 1, wherein said color correction means comprises a matrix-type color corrector.

10. The system of claim 1, wherein said threshold magnitude varying means comprises means for repetitively providing a plurality of luminance threshold signals in succession at the subcarrier frequency.

11. The system of claim 10, further comprising memory means for storing said plurality of luminance threshold signals in locations associated with a plurality of different hues.

12. The system of claim 1, further comprising operator control means for controlling said predetermined threshold magnitude.

13. Apparatus for selecting a region of a video image for receiving corrections to a video parameter as a function of the luminance and of a video characteristic of said region, comprising:
   luminance threshold means responsive to a video characteristic of an input video signal for selecting a particular one of a plurality of luminance threshold signals;
   operator control means for selectively varying at least one of said plurality of luminance threshold signals;
   video signal correction means responsive to said video characteristic for selecting a particular one of a plurality of video signal correction signals; and
   means responsive to said selected one of said luminance threshold signals and said selected one of said video signal correction signals for correcting a parameter of said input video signal to provide a corrected video output signal.

14. The apparatus of claim 13, wherein said correcting means comprises a phase responsive color corrector.

15. The apparatus of claim 13, wherein said correcting means comprises a matrix-type color corrector.

16. The apparatus of claim 13, wherein said correcting means corrects the hue of said input video signal.

17. The apparatus of claim 13, wherein said correcting means corrects the saturation of said input video signal.

18. The apparatus of claim 13, wherein said correcting means corrects the luminance of said input video signal.

19. The apparatus of claim 13, wherein each one of said luminance threshold signals may be a negative threshold or a positive threshold, and further comprising means for selecting between a positive threshold or a negative threshold for a given one of said luminance threshold signals.

20. The apparatus of claim 13, wherein said luminance threshold means provides a different one of said plurality of said luminance threshold signals for each of a plurality of different hues occurring in a single horizontal video line.

21. The apparatus of claim 13, wherein said luminance threshold means comprises means for repetitively providing said plurality of luminance threshold signals in succession at the subcarrier frequency, and wherein said video characteristic comprises the instantaneous hue of said input video signal.

22. The apparatus of claim 13, wherein said video characteristic is hue, and further comprising memory means for storing said plurality of luminance threshold signals in locations associated with a plurality of different hues.

* * * * *